United States Patent [19]
May

[11] Patent Number: 5,929,426
[45] Date of Patent: Jul. 27, 1999

[54] MAGNETIC CARD SENSOR FOR SENSING PRESENCE OF A CARD HAVING A MAGNETIC STRIPE AND THICKNESS COMPLYING WITH ISO STANDARD

[75] Inventor: David C. C. May, Darsie, United Kingdom

[73] Assignee: NCR Corporation, Dayton, Ohio

[21] Appl. No.: 08/883,472

[22] Filed: Jul. 25, 1997

[30]   Foreign Application Priority Data

Oct. 8, 1996 [GB] United Kingdom ............... 9620966

[51] Int. Cl.⁶ .................... G06K 13/00; G06K 13/04
[52] U.S. Cl. .................... 235/475; 235/479; 235/486; 235/441; 194/205; 194/212
[58] Field of Search .................... 235/475, 479, 235/486, 441; 194/205, 211, 212, 335

[56]      References Cited

U.S. PATENT DOCUMENTS

| | | |
|---|---|---|
| 3,712,973 | 1/1973 | Kral ........................................ 235/475 |
| 4,803,349 | 2/1989 | Suginoto et al. ....................... 235/475 |
| 5,045,674 | 9/1991 | Mita et al. .............................. 235/439 |
| 5,101,098 | 3/1992 | Naito ...................................... 235/475 |
| 5,563,397 | 10/1996 | Fujimoto et al. ....................... 235/441 |

*Primary Examiner*—Donald Hajec
*Assistant Examiner*—Daniel St. Cyr

[57]           ABSTRACT

A card sensor to operate the entry shutter (120) of an ATM 50 as a magnetic sensor (118) in a well (116) on the lower surface of an entry slot (110). A pair of inverted U-shaped springs (134) project into the slot (110) beyond the sensor (118). When a card (113) complying with ISO standard 7810 is inserted into the slot, the springs (134) are compressed, the magnetic stripe (132) on the card (130) contacts the sensor (118), and the shutter (120) is opened. If a thinner card, such as a telephone card or a public transport ticket (140), is inserted into the slot, the springs (134) are compressed insufficiently for any magnetic stripe (142) on the card to contact the sensor (118).

6 Claims, 3 Drawing Sheets

MAGNETIC CARD SENSOR FOR SENSING PRESENCE OF A CARD HAVING A MAGNETIC STRIPE AND THICKNESS COMPLYING WITH ISO STANDARD

BACKGROUND OF THE INVENTION

This invention relates to a magnetic card sensor, especially to a arranged to sense the thickness of a card.

Magnetic cards are specified in ISO Standards Nos. 7810 and 7811, which sets out the card dimensions including the thickness, which is 0.76mm, and the position of the data bearing magnetic stripe. All credit/debit and bank cards conform to this standard worldwide. The cards are usually made of plastics material which at a thickness of 0.76mm gives a semi-rigid card. Such a card will be referred to in this specification as a standard card.

Self service terminals, such as automated teller machines (ATMs), which are operated by insertion of a standard card are often provided with a shutter mechanism within the card entry slot to protect the interior of the terminal from the environment and from vandals. The terminals are then provided with a card sensor which senses insertion of a card into the slot, and passes a signal to a processor operating the terminal. The shutter is then opened, and a transport system draws the card into the terminal to be positioned adjacent to a card reader/writer. It is a requirement that such a transport system operates very smoothly so that the card is moved smoothly and accurately over the head of the card reader/writer.

Such card sensors operate by sensing the presence of the magnetic stripe on the card when the card is in the slot in the specified position.

Another type of card which has come into wide use is a card, often of paper but sometimes of plastics material, used for telephone cards or public transport tickets. Such cards are often of similar size to the standard cards, and often have a magnetic stripe in the same position as a standard card, but they are thinner, and flexible. In this specification, such a card will be referred to as a thin card.

Sometimes thin cards are inserted by error, or mischief or malice, into the card slot of a self service terminal designed to operate with a standard card. Since currently-available card sensors operate by sensing the magnetic stripe on the card, the shutter is opened and the transport system draws the thin card into the terminal. Since the transport system is designed to operate on the greater thickness of a standard card, a thin card cannot be gripped, with the result that it can neither be ejected from the terminal nor moved into a purge bin. The terminal is therefore in effect jammed by the thin card and is put out of service until a service engineer can visit its site to clear the jam. This is inconvenient and expensive for the financial organization operating the terminal.

SUMMARY OF THE INVENTION

It is the object of the invention to provide a card sensor for a standard card which is not operated by a thin card and which has a simple construction.

According to the invention there is provided a card sensor comprising a card entry slot dimensioned to accept a card complying with ISO Standard No. 7810; on one side of the slot an aperture containing a magnetic sensor positioned to coincide with the magnetic stripe on a standard card inserted into the slot, and arranged to provide a signal when such a magnetic stripe contacts the sensor, characterized by spring means adjacent the magnetic sensor and projecting into the slot to such a distance that insertion of a standard card compresses the spring means so that the magnetic stripe on the standard card contacts the sensor but insertion of a thin card compresses the spring means insufficiently for such contact to be made.

DETAILED DESCRIPTION

Figure 1A:
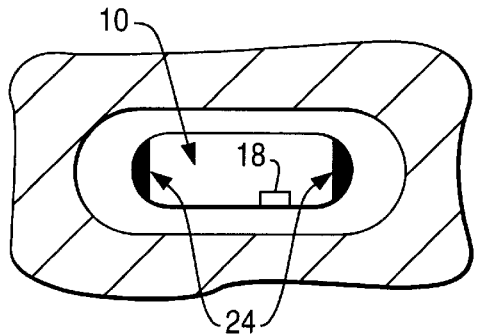
FIGS. 1(*a*) and 1(*b*) show respectively end and side sectional views of a known type of card sensor for an ATM.
Figure 1B:
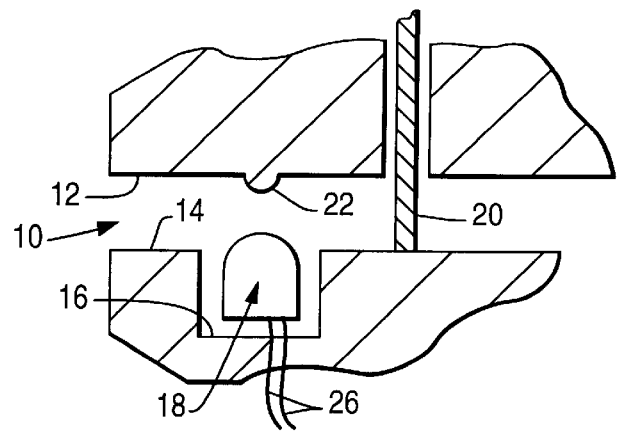

In the known arrangement shown in FIG. 1, a card sensor for an ATM comprises an entry slot 10, positioned horizontally, and having upper and lower surfaces 12,14. In the lower surface 14 there is a well 16 containing a magnetic sensor 18 supported in the well 16 by a flexible suspension (not shown for clarity). Beyond the well 16 the slot 10 is closed by a vertically operating shutter 20.

The magnetic sensor 18 projects by a small distance above the lower surface 14 of the slot, and the upper surface 12 carries in alignment with the sensor 18 a projection 22. The sensor is connected to a monitoring circuit (not shown) by a connector 26, illustrated schematically.

Referring to FIG. 1(*a*), the slot 10 is provided with two width switches 24 set to sense the edges of a standard card inserted lengthwise into the slot.

Figure 2:
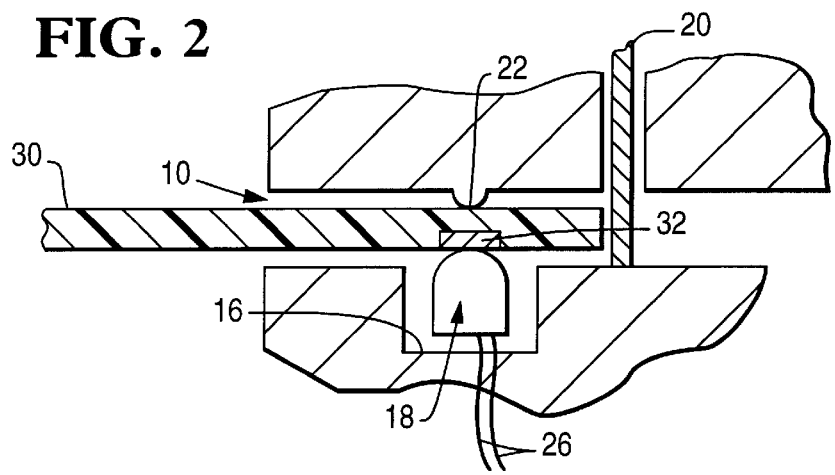
FIG. 2 is a side sectional view of the sensor showing operation by a standard card.

FIG. 2 shows a standard card 30 in the slot 10. The distance between the upper and lower surfaces 12,14 of the slot is just greater than the thickness of the card 30, and the card acts against the projection 22 to press the flexibly-suspended magnetic sensor 18 downwards within the well 16 to ensure good contact between the magnetic sensor 18 and the magnetic stripe 32 on the card 30. The sensor 18 provides a signal over the connection 26 to the monitoring circuit. If the two width switches 24 also indicate that the card 30 is of the correct width, then a processor operating the ATM operates the shutter 20 to open and allow entry of the card 30 into the ATM.

Figure 3A:
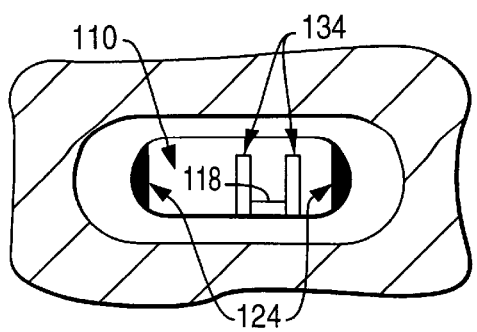
FIGS. 3(*a*) and 3(*b*) which show respectively end and side sectional views of a card sensor according to the invention.
Figure 3B:
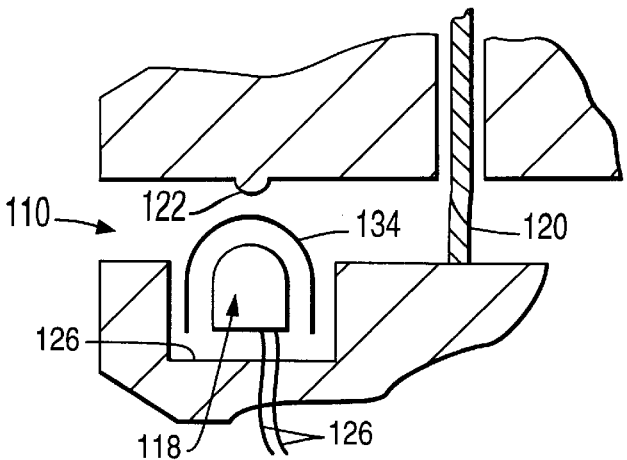

In FIG. 3, parts identical to those in FIGS. 1 and 2 are given references advanced by 100. In addition there is provided a pair of inverted U-shaped springs 134 placed within the well 116 and projecting a substantial distance beyond the magnetic sensor 118 into the slot 110. The springs 134 are spaced on either side of the sensor 118 so that a card entering the slot 110 encounters the upper curved part of both springs, as will be clear from reference to FIGS. 3(*a*) and 3(*b*).

Figure 4:
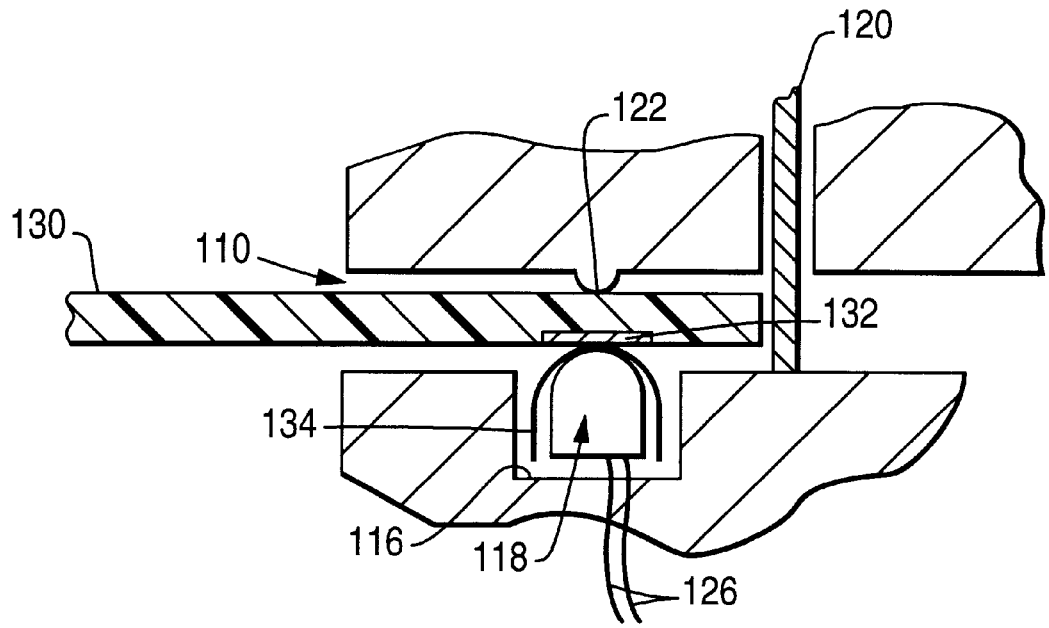
FIG. 4, which is a side sectional view of the sensor showing operation by a standard card.

FIG. 4 shows operation of the card sensor by a standard card 130. When such a card is inserted into the slot 110, the card acts against the projection 122 to press the inverted U-shaped springs 134 into the well 116 so that the magnetic sensor 118 contacts the magnetic stripe 132 on the card, as in a conventional arrangement.

The sensor 118 provides an output signal, and the shutter 120 is opened.

Figure 5:
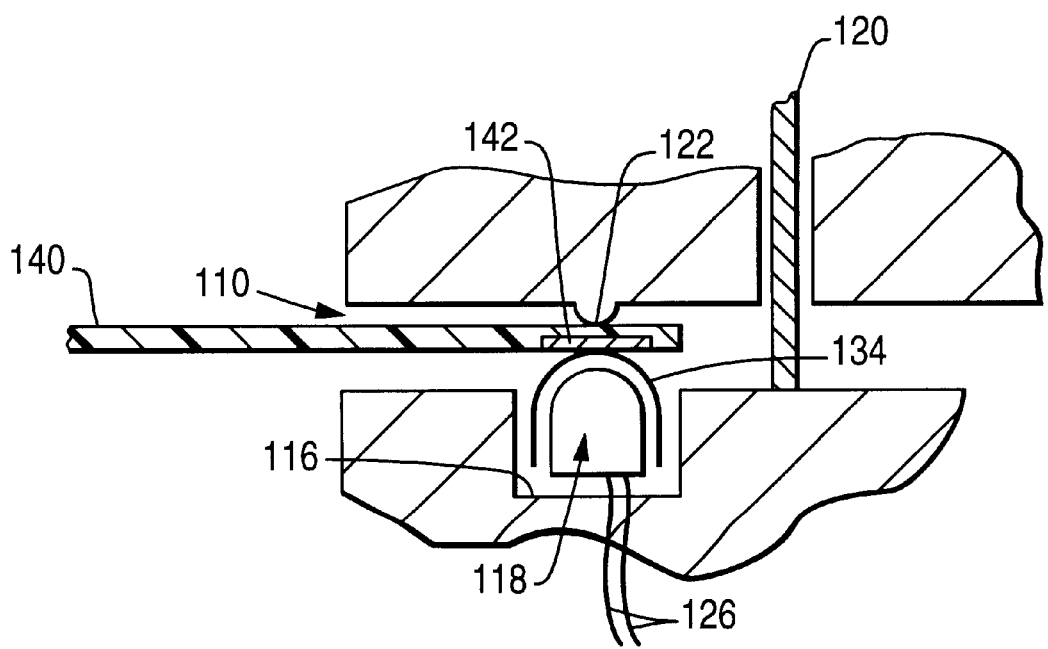
FIG. 5 which is a side sectional view of the sensor showing non-operation of the sensor by a thin card.

FIG. 5 shows how the inventive apparatus distinguishes a thin card from a standard card. If a thin card 140 is inserted into the slot 110, it is not sufficiently thick to compress the U-shaped springs 134 far enough into the well 116 to allow the magnetic stripe 142 on the card to contact the sensor 118. The sensor 118 does not indicate the presence of a card, and the shutter 120 is not opened. The thin card 140 is therefore prevented from jamming the ATM.

Figure 6:
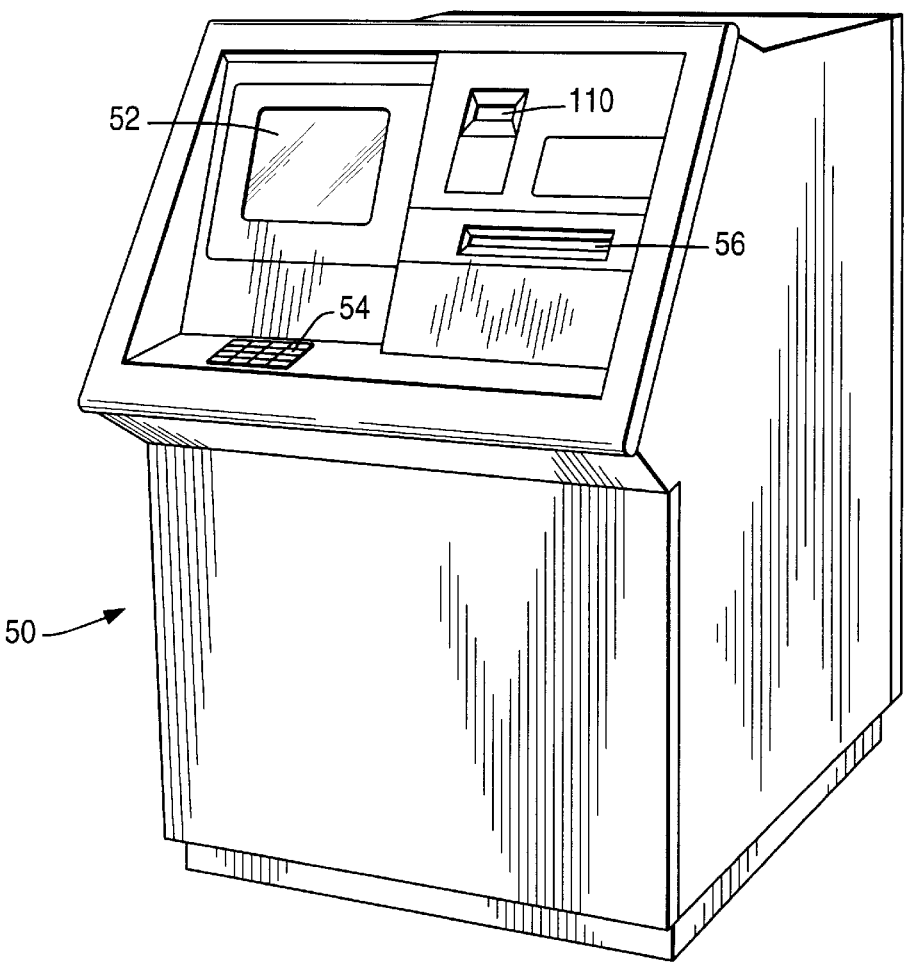
FIG. 6 is a perspective view of an automated teller machine (ATM) embodying a card sensor constructed in accordance with the present invention.

FIG. 6 shows an ATM 50 having a display screen 52, an input keypad 54, and a currency dispense slot 56. The ATM also has a card sensor 110 according to the invention.

Figure 7:
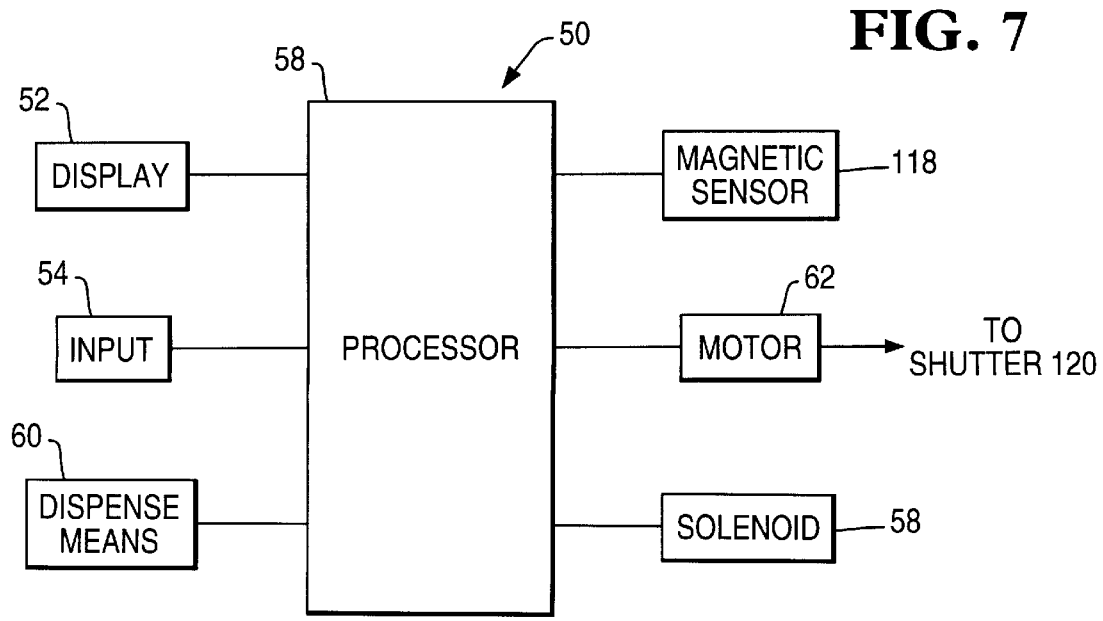
FIG. 7 is a block diagram of a control system of the ATM of FIG. 6.

FIG. 7 illustrates the control system of the ATM 50. A processor 58 receives signals from the input 54, provides suitable signals to the display 52, and dispenses currency notes by dispense means 60 to the dispense slot 56. The processor 58 also receives a signal from the magnetic sensor 118 and, in response to such a signal, operates a motor 62 to open the shutter 120.

What is claimed is:

1. An apparatus for sensing presence of a card having a magnetic stripe and thickness complying with ISO Standard Nos. 7810 and 7811, the apparatus comprising:

surface means defining a card entry slot into which a card can be inserted;

a magnetic sensor located on one side of the card entry slot for providing a contact signal when a magnetic stripe of a card complying with ISO Standard Nos. 7810 and 7811 which has been inserted through the card entry slot contacts the magnetic sensor; and a compressible spring for preventing a magnetic stripe of a relatively thinner card having a thickness less than the thickness of a card complying with ISO Standard Nos. 7810 and 7811 from contacting the magnetic sensor when the relatively thinner card is inserted into the card entry slot and compresses the spring.

2. An apparatus according to claim 1, wherein the magnetic sensor projects with sufficient distance into the card entry slot such that a magnetic stripe of a card complying with ISO Standard Nos. 7810 and 7811 contacts the magnetic sensor when the card is inserted into the card entry slot and compresses the spring.

3. A self-service terminal comprising:

surface means defining a card entry slot into which a card complying with ISO Standard Nos. 7810 and 7811 can be inserted;

a magnetic sensor located on one side of the card entry slot for providing a contact signal when a magnetic stripe of a card complying with ISO Standard Nos. 7810 and 7811 which has been inserted into the card entry slot contacts with the magnetic sensor;

a compressible spring for preventing a magnetic stripe of a relatively thinner card having a thickness less than the thickness of a card complying with ISO Standard Nos. 7810 and 7811 from contacting the magnetic sensor when the relatively thinner card is inserted into the card entry slot and compresses the spring;

a shutter adjacent the card entry slot;

an energizable motor for, when energized, opening the shutter; and a processing unit for (i) monitoring the contact signal from the magnetic sensor, and (ii) providing a control signal which energizes the motor to open the shutter to allow entry of a card complying with ISO Standard Nos. 7810 and 7811 into a card reader when the magnetic sensor provides the contact signal in response to the card being inserted into the card entry slot and compressing the spring.

4. A self-service terminal according to claim 3, wherein the magnetic sensor projects with sufficient distance into the card entry slot such that a magnetic stripe of a card complying with ISO Standard Nos. 7810 and 7811 contacts the magnetic sensor when the card is inserted into the card entry slot and compresses the spring.

5. An apparatus according to claim 1, wherein (i) the surface means defines a well in which the magnetic sensor and the spring are positioned, and (ii) the spring comprises a pair of U-shaped springs positioned in the well and projecting with sufficient distance into the card entry slot such that a relatively thinner card having a thickness less than the thickness of a card complying with ISO Standard Nos. 7810 and 7811 is prevented from contacting the magnetic sensor when the relatively thinner card is inserted into the card entry slot and compresses the pair of U-shaped springs.

6. A self-service terminal according to claim 3, wherein (i) the surface means defines a well in which the magnetic sensor and the spring are positioned, (ii) the spring comprises a pair of U-shaped springs positioned in the well and projecting with sufficient distance into the card entry slot such that a relatively thinner card having a thickness less than the thickness of a card complying with ISO Standard Nos. 7810 and 7811 is prevented from contacting the magnetic sensor when the relatively thinner card is inserted into the card entry slot and compresses the pair of U-shaped springs.

* * * * *